(12) United States Patent
Chen et al.

(10) Patent No.: US 6,198,388 B1
(45) Date of Patent: Mar. 6, 2001

(54) VOICE WARNING SYSTEM FOR AUTOMOBILES

(76) Inventors: Victor Chen; Yu Cheng, both of No.56, Hsiang Hsing Rd., Nan Tun Chu, Taichung Hsi (TW)

( * ) Notice: Subject to any disclaimer, the term of this patent is extended or adjusted under 35 U.S.C. 154(b) by 0 days.

(21) Appl. No.: 09/567,216

(22) Filed: May 9, 2000

(51) Int. Cl.[7] .................................................. B60Q 1/00
(52) U.S. Cl. ......................... 340/460; 340/439; 340/441; 340/449; 340/450.3; 340/452; 340/461
(58) Field of Search ................. 340/425.5, 438, 340/439, 441, 449, 450, 450.3, 452, 455, 459, 460, 461

(56) References Cited

U.S. PATENT DOCUMENTS

| | | | |
|---|---|---|---|
| 4,438,422 | * 3/1984 | Nojiri et al. | 340/460 |
| 4,785,280 | * 11/1988 | Fubini et al. | 340/460 |
| 5,604,479 | * 2/1997 | Chang | 340/460 |
| 5,625,337 | * 4/1997 | Medawar | 340/460 |

* cited by examiner

Primary Examiner—Daniel J. Wu
(74) Attorney, Agent, or Firm—A & J

(57) ABSTRACT

A voice warning system for automobiles includes a microprocessor connected with the battery of an automobile, a plurality of sensors arranged on different parts of the engine and connected with the microprocessor, and two voice integrated circuits for storing voice messages, whereby the microprocessor will give voice messages to notify the driver of the conditions of the car thereby ensuring the safety of the driver.

1 Claim, 2 Drawing Sheets

VOICE WARNING SYSTEM FOR AUTOMOBILES

BACKGROUND OF THE INVENTION

1. Field of the Invention

This invention is related to a voice warning system for automobiles which can ensure the safety of a driver.

2. Description of the Prior Art

The modem automobile is usualy driven by the water cooled, piston-type international combustion engine, mounted in the front of the vehicle. Its power is transmitted to the rear wheels by means of a drive shaft.

However, most drivers cannot know whether the automobile works properly or not and so many accidents happen due to the lack of perceiving the problem of the car.

Therefore, it is an object of the present invention to provide a device which can ensure the safety of a driver.

SUMMARY OF THE INVENTION

This invention is related to a voice warning system for automobiles.

It is the primary object of the present invention to provide a voice warning system which can send out a voice message to notify the driver of the conditions of the car.

It is another object of the present invention to provide a voice warning system which can ensure the safety of the driver.

It is still another object of the present invention to provide a voice warning system which is fit for practical use.

It is still another object of the present invention to provide a voice warning system which is simple in construction.

It is a further object of the present invention to provide a voice warning system which is low in cost.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
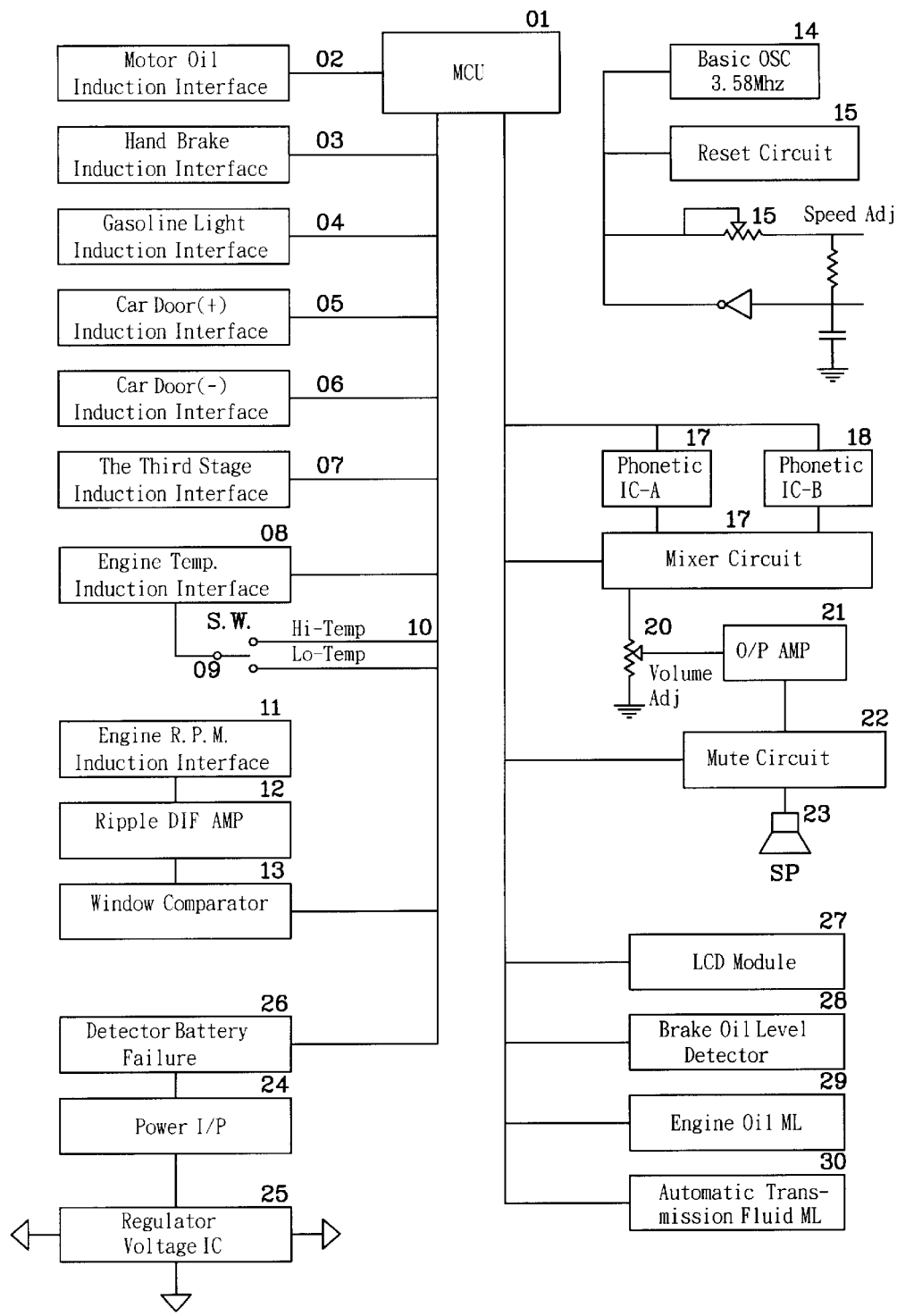
FIG. 1 is a block diagram of a voice warning system for automobiles according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1 thereof, the voice warning system for automobiles according to the present invention comprises a microprocessor 1, a first integrated circuit IC-A 17, and a second integrated circuit an IC-B 18. The microprocessor 1 includes CPU, RAM, ROM, temporary memory and operational unit. Each of the integrated circuits IC-A 17 and IC-B 18 stores nine warning messages. A LCD module 27 is used for displaying data or images generated by the microprocessor 1. As a voltage of 12V is applied to the power input 24, the voltage will be regulated by a voltage regulator 25 to a voltage of 5V for supplying power to all block circuits. When an automobile is not started, the engine oil indicator lamp sensing interface 2 is at LOW condition and the third stage lock sensing interface 7 is also at LOW condition. When the automobile is started, these two blocks will be at HI condition which means that the automobile is successfully started. Meanwhile, the power input 24 is alreadly supplied with a voltage which is regulated by the voltage regulator 25 to a voltage of 5V for supplying voltage to all block circuits. As the voltage rises from 0 to 5V, a reset circuit 15 will send out a reset pulse signal to the microprocessor 1 for resetting its condition. In addition, a time base oscillator 14 begins to generate a time base of 3.58 MHZ and provide it to the microprocessor 1. After a time delay of 3 seconds, the microprocessor 1 will trigger the first address voice of the IC-A 17 which will be converted into voice via PCM (pulse code modulation). Then, the voice will be mixed by a mixer 19 which is further adjusted to the desired magnitude by a volume control 20.

Thereafter, the voice is enlarged by 40 dB by an amplifier 21 which is then output to a loudspeaker 23 via a mute circuit 22 to give a voice message "Condition voice computer is beginning to inspect the car", which means that the system is at present subject to the protecting inspection mode. As the automobile is started, the present invention will begin to inspect the safety and protection action of the automobile.

The speed of the engine of an automobile is directly proportional to the frequency of the igniting waves. The higher the speed of the engine is, the higher the frequency of the igniting ripple will be. In installation, the engine speed sensor is adjusted at 2000 revolutions so that the engine speed will be higher than this value when the automobile travels normally thereby making it possible to discriminate whether the automobile is stopped (engine speed below 1500 revolutions) or moving (engine speed above 2000 revolutions). An engine speed sensing interface 11 picks up ripples from the power which will be enlarged 1000 times by a ripple differential amplifier 12 and then modified by a window comparator 13 to high pulse signal which is then transmitted to the microprocessor 1. The correct engine speed is obtained (since automobiles are of different numbers of cylinders, it is necessary to perform this adjustment) by proportionally subtracting the value of the engine speed sensing adjustment 16 from the signal.

When the microprocessor 1 finds the engine speed over 2000 revolutions, the automobile must travel normally. In the meantime, if the door positive sensing interface 5 is negative or the door negative sensing interface 6 is positive, this means that the door(s) are not closed and the microprocessor 1 will immediately trigger the IC-A 17 to send out another warning message "Please close the door.", thereby ensuring the safety in driving. When the automobile begins to travel, the microprocessor 1 will first discriminate whether the hand brake sensing interface 3 is at the Hi condition (Hi and Low refer to the conditions that the hand brake is released or pulled respectively.).

If the hand brake sensing interface 3 is at the Low condition, the microprocessor 1 will immediately trigger the IC-A 17 to send out the third warning message "Please release the hand brake" through the loudspeaker 23.

If the engine oil is insufficient, the engine oil sensing interface 2 will be at Low condition and when the engine speed is higher than O revolution, the microprocessor will immediately send out the fourth warning message "Insufficient engine oil" through the loudspeaker 23.

When the engine is overheated due to excessive running of the the engine or insufficient cooling water, the engine temperature sensor will pick up the overheat condition of the engine which will be transmitted to a high-low temperature selection 9 through an engine temperature sensing interface 8. High or low temperature sensor is chosen depending on the category of the automobiles. After the high-low temperature comparation 10, if the temperature of the engine exceeds the normal value, a signal will be sent to the microprocessor 1 which will trigger the IC-B 18 to send out the fifth warning message "engine overheated".

If the gasoline sensing interface 4 is at Low condition, this means that the gasoline is insufficient and a signal will be sent to the microprocessor 1 which will then trigger the IC-B 18 to send out the sixth warning message "insufficient gasoline" every five minutes through the loudspeaker 23.

When the voltage of the battery is found lower than 11.4V by the power detector 26, this means that there is something wrong with the power generating system of the automobile or the battery is not working properly. Then, a signal will be sent to the microprocessor 1 which will trigger the IC-B 18 to send out the seventh warning message "Please check power generating system and belts" through the loudspeaker 23.

The microprocessor 1 can be set as required so that the eighth warning message "Insufficient brake oil" will be sent out to remind the driver of filling brake oil through the brake oil level detector 28.

Further, the microprocessor 1 can be set as required so that the ninth warning message "Please change engine oil" will be sent out to notify the driver of changing engine oil through the engine oil mileage interface 29 after the automobile has traveled a certain distance such as 5000 Km (about 3000 miles).

Likewise, the microprocessor 1 can be set as required so that the ninth warning message "Please change automatic transmission fluid" will be sent out to inform the driver of changing automatic transmission fluid through the automatic transmission fluid mileage interface 30 after the automobile has traveled a certain distance such as 30,000 Km (about 18,500 miles).

When the present invention does not send out any warning, the mute circuit 22 will keep on working and the loudspeaker 23 is cut off to prevent igniting noise produced from entering thereby preventing the production of noise. Further, the microprocessor 1 will output indicating sound to the mining circuit before the IC is triggered to send out warning messages thereby preventing the driver from being scarced.

Figure 2:
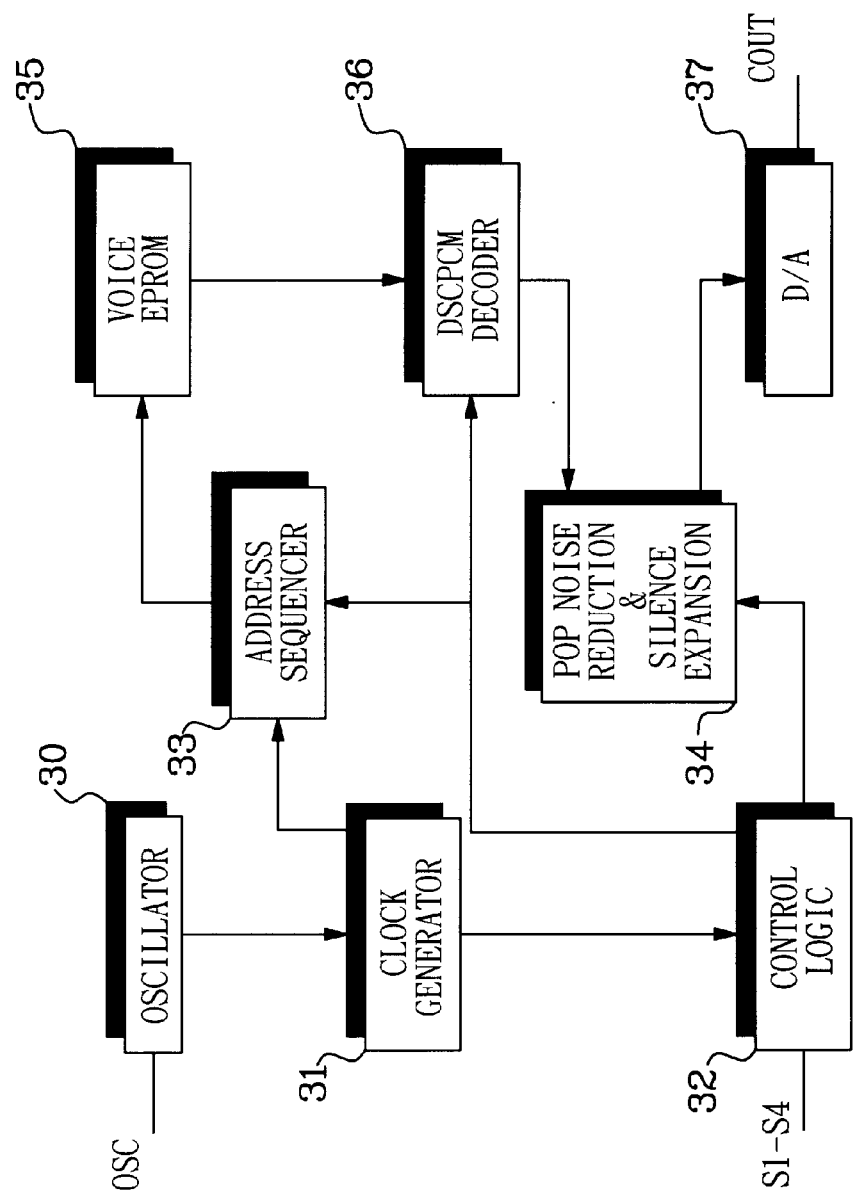
FIG. 2 is a block diagram of the voice integrated circuit.

Referring to FIG. 2, the voice integrated circuits IC-A 17 and IC-B 18 are made from APLUS INTEGRATED CIRCUITS INC. and includes an oscillator 30, a clock generator 31, a control logic 32, an address sequencer 33, a pop noise reduction and silence expansion 34, a voice EPROM 35, a DSCPCM decoder 36 and a D/A converter 37. The working principle of the voice integrated circuits are well known in the art and not considered a part of the invention and need not be described here in detail.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A voice warning system for automobiles comprising:
   a microprocessor,
   a first voice integrated circuit;
   a second voice integrated circuit;
   a power input;
   a voltage regulator;
   an engine oil indicator lamp sensing interface;
   a third stage lock sensing interface;
   a reset circuit;
   a time base oscillator;
   a mixer;
   a volume control;
   an amplifier;
   a loudspeaker;
   a quieting circuit;
   an engine speed sensor;
   an engine speed sensing interface;
   a ripple differential amplifier;
   a window comparator;
   an engine speed sensing adjustment;
   a door positive sensing interface;
   a door negative sensing interface;
   a hand brake sensing interface;
   an engine oil sensing interface;
   an engine temperature sensor;
   an high-low temperature selection;
   a gasoline sensing interface;
   a LCD module;
   a brake oil level detector;
   an engine oil mileage interface;
   an automatic transmission fluid mileage interface;
   a battery; and
   a power detector;
   whereby when a voltage of 12 V is applied to said power input, the voltage will be regulated by said voltage regulator to a voltage for supplying power to all circuits; when an automobile is not started, said engine oil indicator lamp sensing interface is at LOW condition and said third stage lock sensing interface is also at LOW condition; when the automobile is started, these two interfaces will be at HI condition and meanwhile said power input is already supplied with a voltage which is regulated by said voltage regulator to a voltage of 5V for supplying voltage to all circuits; when the voltage rises from 0 to 5V said reset circuit will send out a reset pulse signal to said microprocessor for resetting its condition and said time base oscillator begins to generate a time base of 3.58 MHZ and provide it to said microprocessor; after a time delay of 3 seconds, said microprocessor will trigger the first address voice of said first voice integrated circuit which will be converted into voice via PCM (pulse code modulation), the voice will be mixed by said mixer which is further adjusted to a desired magnitude by said volume control, and then the voice will be enlarged 40 dB by said amplifier which is then output to said loudspeaker via said quieting circuit to give a voice message "condition voice computer is beginning to inspect"; said engine speed sensor is adjusted at 2000 revolutions so that the engine speed will be higher than this value when the automobile travels normally thereby making it possible to discriminate whether the automobile is stopped (engine sped below 1500 revolutions) or moving (engine speed above 2000 revolutions); said engine speed sensing interface picks up ripples from the power which will be enlarged 1000 times by said ripple differential amplifier and then modified by said window comparator to high pulse signal which is then transmitted to said microprocessor, a correct engine speed is obtained by proportionally subtracting a value of said engine speed sensing adjustment from the signal; when microprocessor finds the engine speed over 2000 revolutions, the automobile must travel normally and if the vehicle door is not closed, said door positive sensing interface is negative or said door negative sensing interface is positive and said microprocessor will immediately trigger said first voice integrated circuit to send out another warning message "Please close the door"; when the automobile begins to travel, said microprocessor will first determine whether said hand brake sensing interface is at HI condition; if said hand brake sensing interface is at LOW condition, said microprocessor will immediately trigger said first voice integrated circuit to send out the third warning "Please release the hand brake" through said loudspeaker; if the engine oil is insufficient, said engine oil sensing interface will be at LOW condition and when the engine speed is higher than 0 revolution, said microprocessor will immediately send out the fourth warning "Insufficient engine oil" through said loudspeaker; when the engine is overheated due to excessive running or insufficient cooling water, said engine temperature sensor will pick up the overheat condition which will be transmitted to said high-low temperature selection, and if the temperature of the engine exceeds a normal value after high-low temperature comparison, a signal will be sent to said microprocessor which will trigger said second voice integrated circuit to send out the fifth warning "engine overheated"; if said gasoline sensing interface is at LOW condition, this means that the gasoline is insufficient and a signal will be sent to said microprocessor which will then trigger said second voice integrated circuit to send out the sixth warning "insufficient gasoline" every five minutes through said loudspeaker; said microprocessor is set to send out a warning message "Insufficient brake oil" remind said driver of filling brake oil through said brake oil level detector; said microprocessor is set to send out a warning message "Please change engine oil" to notify the driver of changing engine oil through said engine oil mileage interface after said automobile has traveled a certain distance; said microprocessor is set to send out a warning message "Please change automatic transmission fluid" to inform said driver of changing automatic transmission fluid through said automatic transmission fluid mileage interface after said automobile has traveled a certain distance; when the voltage of said battery is found lower than 11.4V by said power detector, this means that there is something wrong with the power generating system of the automobile or said battery is not working properly and then a signal will be sent to said microprocessor which will trigger the second voice integrated circuit to send out the seventh warning message "Please check power generating system and belts" through said loudspeaker.

\* \* \* \* \*